US012682680B2

(12) United States Patent

Li et al.

(10) Patent No.: US 12,682,680 B2

(45) Date of Patent: Jul. 14, 2026

(54) ATTRIBUTE-CONSISTENT IMAGE FUSION AND MODEL TRAINING METHODS, APPARATUSES, AND COMPUTER DEVICES

(71) Applicant: Alipay (Hangzhou) Information Technology Co., Ltd., Hangzhou (CN)

(72) Inventors: Ang Li, Hangzhou (CN); Jun Zhou, Hangzhou (CN); Chilin Fu, Hangzhou (CN); Xiaolu Zhang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 287 days.

(21) Appl. No.: 18/453,881

(22) Filed: Aug. 22, 2023

(65) Prior Publication Data

US 2024/0062531 A1 Feb. 22, 2024

(30) Foreign Application Priority Data

Aug. 22, 2022 (CN) .......................... 202211005416.3

(51) Int. Cl.
 *G06V 40/16* (2022.01)
(52) U.S. Cl.
 CPC .......... *G06V 40/172* (2022.01); *G06V 40/168* (2022.01); *G06T 2207/20221* (2013.01)
(58) Field of Classification Search
 CPC ................ G06V 40/172; G06V 40/168; G06T 2207/20221
 See application file for complete search history.

(56) References Cited

U.S. PATENT DOCUMENTS

2023/0081982 A1* 3/2023 He ........................ G06V 10/751
 382/157

OTHER PUBLICATIONS

Li et al, "Attribute-Conditioned Face Swapping Network for Low-Resolution Images" (published in ICASSP 2022—2022 IEEE International Conference on Acoustics, Speech and Signal Processing (ICASSP), Apr. 2022).*
Celik et al, "Enhanced Facial Feature Extraction Using Region-Based Super-Resolution Aided Video Sequences" (published at International Conference Image Analysis and Recognition 2005, Lecture Notes in Computer Science, vol. 3656, pp. 1141-1148).*

* cited by examiner

*Primary Examiner* — Casey L Kretzer
(74) *Attorney, Agent, or Firm* — Fish & Richardson P.C.

(57) ABSTRACT

A computer-implemented method for image processing includes obtaining, based on a source image including a first biological object, an identity feature and attribute feature used to represent identity information and attribute information of the first biological object. Based on a target image including a second biological object, a context feature used to represent context information of the second biological object is obtained. Based on the identity feature, a fused image of the source image and the target image, the attribute feature, and the context feature is generated, where the fused image includes a fused biological object of a first biological object and the second biological object, identity information and attribute information of the fused biological object is identical to the identity information and the attribute information of the first biological object, and context information of the fused biological object is identical to the context information of the second biological object.

17 Claims, 5 Drawing Sheets

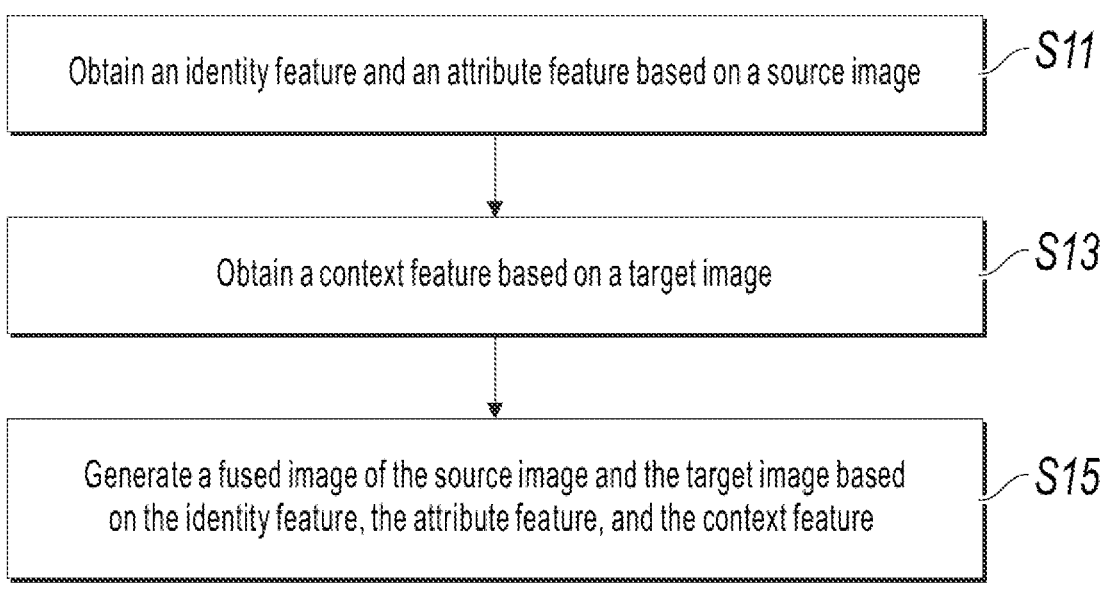

Obtain an identity feature and an attribute feature based on a source image ⟶ S11

Obtain a context feature based on a target image ⟶ S13

Generate a fused image of the source image and the target image based on the identity feature, the attribute feature, and the context feature ⟶ S15

FIG. 2

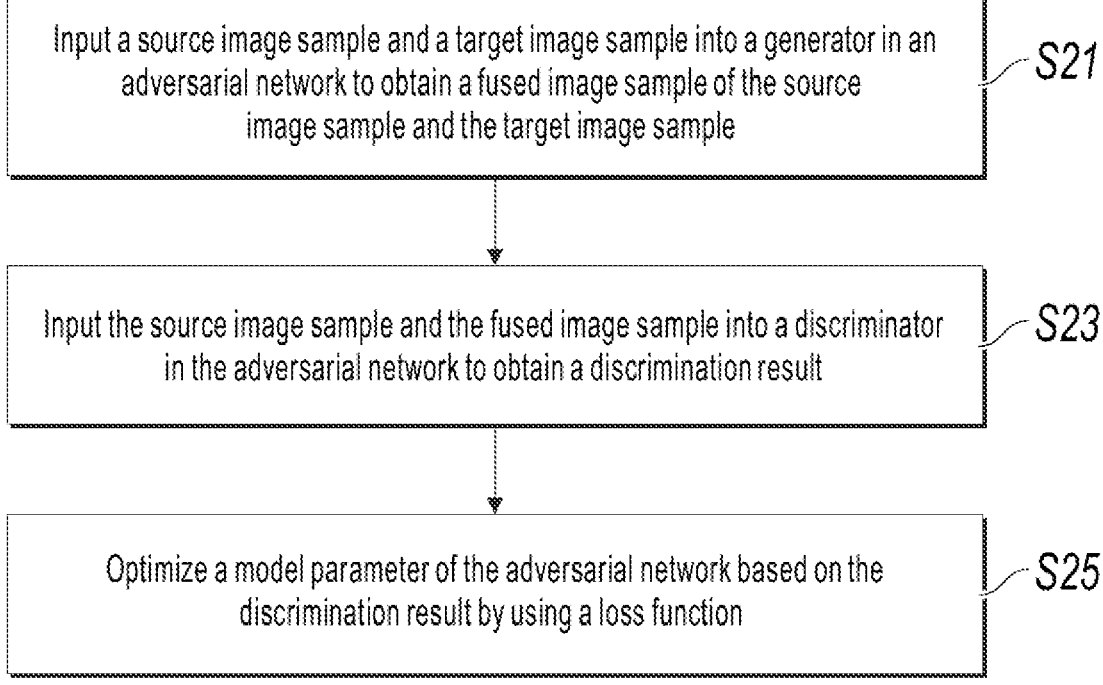

Input a source image sample and a target image sample into a generator in an adversarial network to obtain a fused image sample of the source image sample and the target image sample ⟶ S21

Input the source image sample and the fused image sample into a discriminator in the adversarial network to obtain a discrimination result ⟶ S23

Optimize a model parameter of the adversarial network based on the discrimination result by using a loss function ⟶ S25

FIG. 3

ATTRIBUTE-CONSISTENT IMAGE FUSION AND MODEL TRAINING METHODS, APPARATUSES, AND COMPUTER DEVICES

CROSS-REFERENCE TO RELATED APPLICATIONS

This application claims priority to Chinese Patent Application No. 202211005416.3, filed on Aug. 22, 2022, which is hereby incorporated by reference in its entirety.

TECHNICAL FIELD

Embodiments of this specification relate to the field of computer technologies, and in particular, to image processing methods and apparatuses, model training methods and apparatuses, and computer devices.

BACKGROUND

Image fusion technologies have extensive application scenarios. By using an image fusion technology, information about a biological object in a source image and information about a biological object in a target image can be fused to obtain a fused image. For example, by using an image fusion technology, information about a face in a source image and information about a face in a target image can be fused to obtain a face-shifted image.

However, in current image fusion technologies, detailed attributes of a biological object in a fused image cannot be kept consistent with detailed attributes of a biological object in a source image. For example, a beard color in a face-shifted image cannot be kept consistent with a beard color in a source image.

SUMMARY

Embodiments of this specification provide image processing methods and apparatuses, model training methods and apparatuses, and computer devices, so that a degree of similarity between detailed attributes of a fused image and detailed attributes of a source image can be improved.

According to a first aspect of the embodiments of this specification, an image processing method is provided, including: obtaining an identity feature and an attribute feature based on a source image, where the source image includes a first biological object, the identity feature is used to represent identity information of the first biological object, and the attribute feature is used to represent attribute information of the first biological object; obtaining a context feature based on a target image, where the target image includes a second biological object, and the context feature is used to represent context information of the second biological object; and generating a fused image of the source image and the target image based on the identity feature, the attribute feature, and the context feature, where the fused image includes a fused biological object of the first biological object and the second biological object, identity information and attribute information of the fused biological object are the same as the identity information and the attribute information of the first biological object, and context information of the fused biological object is the same as the context information of the second biological object.

According to a second aspect of the embodiments of this specification, a model training method is provided, including: inputting a source image sample and a target image sample into a generator in an adversarial network to obtain a fused image sample of the source image sample and the target image sample, where the source image sample includes a first biological object, the target image sample includes a second biological object, and the fused image sample includes a fused biological object of the first biological object and the second biological object; inputting the source image sample and the fused image sample into a discriminator in the adversarial network to obtain a discrimination result; and optimizing a model parameter of the adversarial network based on the discrimination result by using a loss function, where the loss function includes at least a first term, and the first term is used to constrain an attribute information deviation between the fused biological object and the first biological object.

According to a third aspect of the embodiments of this specification, an image processing apparatus is provided, including: a first acquisition unit, configured to obtain an identity feature and an attribute feature based on a source image, where the source image includes a first biological object, the identity feature is used to represent identity information of the first biological object, and the attribute feature is used to represent attribute information of the first biological object; a second acquisition unit, configured to obtain a context feature based on a target image, where the target image includes a second biological object, and the context feature is used to represent context information of the second biological object; and a generation unit, configured to generate a fused image of the source image and the target image based on the identity feature, the attribute feature, and the context feature, where the fused image includes a fused biological object of the first biological object and the second biological object, identity information and attribute information of the fused biological object are the same as the identity information and the attribute information of the first biological object, and context information of the fused biological object is the same as the context information of the second biological object.

According to a fourth aspect of the embodiments of this specification, a model training apparatus is provided, including: a first input unit, configured to input a source image sample and a target image sample into a generator in an adversarial network to obtain a fused image sample of the source image sample and the target image sample, where the source image sample includes a first biological object, the target image sample includes a second biological object, and the fused image sample includes a fused biological object of the first biological object and the second biological object; a second input unit, configured to input the source image sample and the fused image sample into a discriminator in the adversarial network to obtain a discrimination result; and an optimization unit, configured to optimize a model parameter of the adversarial network based on the discrimination result by using a loss function, where the loss function includes at least a first term, and the first term is used to constrain an attribute information deviation between the fused biological object and the first biological object.

According to a fifth aspect of the embodiments of this specification, a computer device is provided, including: at least one processor; and a memory storing program instructions, where the program instructions are configured to be suitable for execution by the at least one processor, and the program instructions include instructions used to perform the methods according to the first aspect or the second aspect.

According to the technical solutions provided in the embodiments of this specification, the identity feature and the attribute feature can be obtained based on the source image; the context feature can be obtained based on the target image; and the fused image of the source image and the target image can be generated based on the identity feature, the attribute feature, and the context feature. As such, detailed attributes of the biological object in the source image can be migrated to the biological object in the fused image in an attribute editing way, so that the detailed attributes of the biological object in the fused image are consistent with the detailed attributes of the biological object in the source image, thereby improving a degree of similarity between the detailed attributes of the fused image and the detailed attributes of the source image. In addition, according to the technical solutions provided in the embodiments of this specification, the loss function of the adversarial network can include the first term, and the first term is used to constrain the attribute information deviation between the third biological object and the first biological object. Therefore, the generator obtained by training by using the loss function can generate a fused image that has detailed attributes more similar with the detailed attributes of the source image.

BRIEF DESCRIPTION OF DRAWINGS

To describe technical solutions in embodiments of this specification or in the existing technologies more clearly, the following briefly describes the accompanying drawings needed for describing the embodiments or the existing technologies. The accompanying drawings described below are merely some embodiments described in this specification, and a person of ordinary skill in the art can derive other accompanying drawings from these accompanying drawings without creative efforts.

FIG. 2 is a schematic flowchart of an image processing method according to some embodiments of this specification;

FIG. 3 is a schematic flowchart of a model training method according to some embodiments of this specification;

DESCRIPTION OF EMBODIMENTS

The following clearly and comprehensively describes technical solutions in embodiments of this specification with reference to accompanying drawings in the embodiments of this specification. Clearly, described embodiments are merely some rather than all of the embodiments of this specification. All other embodiments obtained by a person of ordinary skill in the art based on the embodiments of this specification without creative efforts shall fall within the protection scope of this specification.

Figure 1:
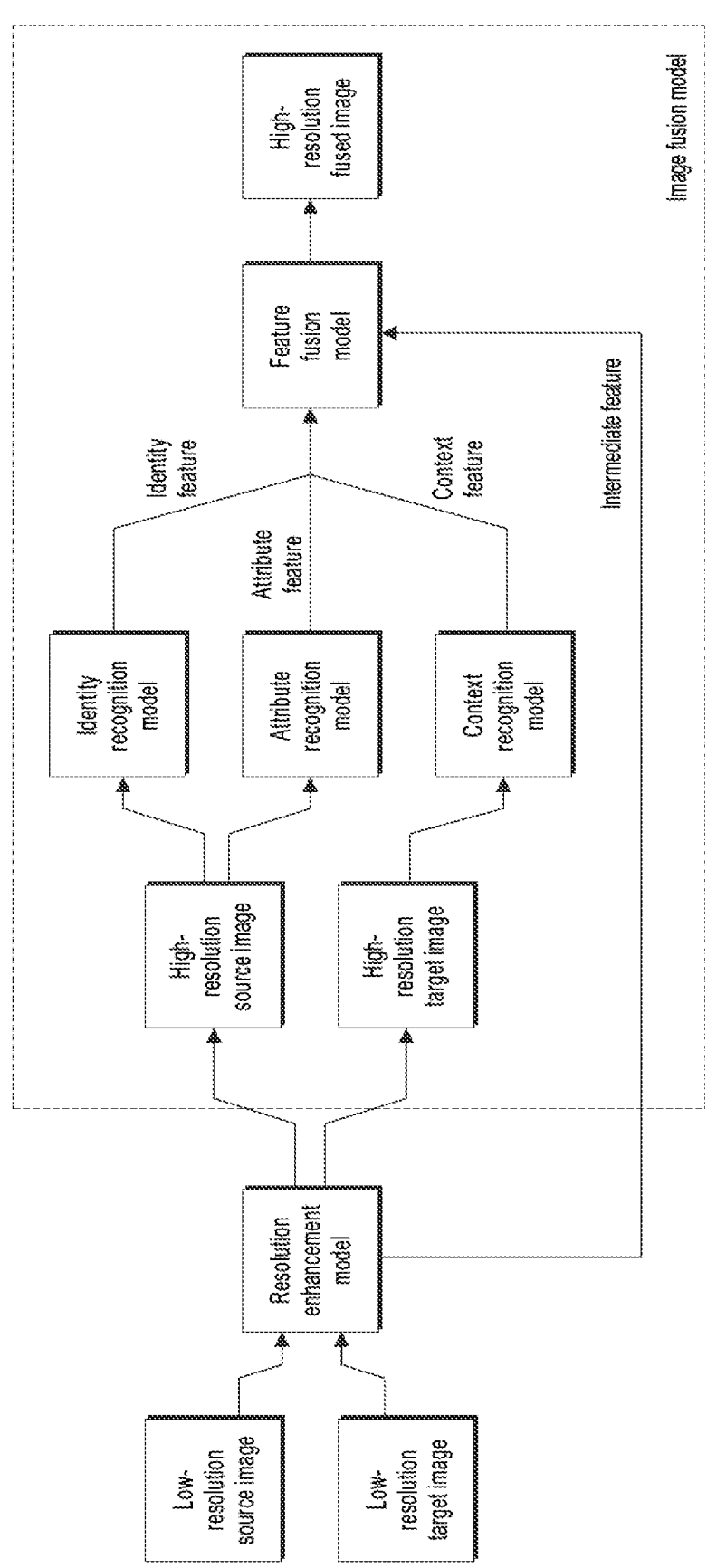
FIG. 1 is a schematic diagram of a structure of a model architecture according to some embodiments of this specification.

FIG. 1 shows a model architecture for processing image data according to some embodiments of this specification.

By using the model architecture, a source image and a target image can be fused to obtain a fused image. The source image, the target image, and the fused image can be biological feature images. The biological feature image can be a face image, an iris image, a fingerprint image, a palmprint image, a teeth bite mark image, or the like. Specifically, the source image can include a first biological object, the target image can include a second biological object, and the fused image can include a third biological object. The third biological object can be a fused biological object of the first biological object and the second biological object. The first biological object, the second biological object, and the third biological object each can be a face, an iris, a sclera, a fingerprint, a palmprint, a teeth bite, or the like.

In some embodiments, the model architecture can include a resolution enhancement model and an image fusion model. The resolution enhancement model is configured to perform resolution enhancement processing on the source image and the target image. The resolution enhancement model can perform resolution enhancement processing based on a super-resolution (SR) algorithm. The resolution enhancement model can include a neural network model. The neural network model can include an SRCNN model, an FSRCNN model, an ESPCN model, an encoder-decoder model, and the like. The image fusion model is configured to generate the fused image based on a resolution-enhanced source image and a resolution-enhanced target image.

In actual applications, the image fusion model in the model architecture is usually designed and implemented based on high-resolution images, and has undesirable performance for low-resolution images. By using the resolution enhancement model, resolution of the source image and the target image can be improved, performance of the image fusion model can be improved, and a fusion effect of the model architecture can be improved.

In some embodiments, the image fusion model can include an identity recognition model. The identity recognition model is configured to extract an identity feature (Identity) from the resolution-enhanced source image. The identity recognition model can include a neural network model, a support vector machine model, and the like. The neural network model can include a convolutional neural network model. The convolutional neural network model can include an AlexNet model, a GoogLeNet model, and the like. The identity feature can be a feature vector, a feature matrix, or a feature map. The identity feature is used to represent identity information of the first biological object. For example, the source image is a face image. The identity recognition model is a face recognition model. The face recognition model can extract an identity feature from a face image. The identity feature can be a feature used to represent a face identity, such as a structural feature of a face.

In some embodiments, the image fusion model can further include an attribute recognition model. The attribute recognition model is configured to extract an attribute feature from the resolution enhanced-source image. The attribute recognition model can include a neural network model, a support vector machine model, and the like. The neural network model can include a convolutional neural network model. The convolutional neural network model can include an AlexNet model, a GoogLeNet model, and the like. The attribute feature can be a feature vector, a feature matrix, or a feature map. The attribute feature is used to represent attribute information of the first biological object. The attribute information can include an appearance, a style, and the like. For example, the source image is a face image. The attribute feature includes at least one of the following: a beard feature used to represent beard information, a pouch feature used to represent pouch information, a gender feature used to represent gender information, and an age feature used to represent age information. The beard information includes a beard color, a beard shape, and the like. The pouch information includes a pouch type, for example, a congenital type, a fatty type, or a loose type. The gender information is used to represent a gender. The age information is used to represent an age stage.

In some scenario examples, the attribute recognition model can include an attribute classification model. The attribute classification model is configured to classify one or more pieces of attribute information of the first biological object. The attribute feature can include a classification result for the one or pieces of more attribute information. For example, the source image is a face image. The attribute classification model is used to classify beard information, pouch information, gender information, age information, and the like of a face to obtain a classification result. The classification result can be represented as a matrix $a=[a1, a2, a3, a4]$. $a1$ can be represented as a vector $a1=[a11, a12, a13, a14]$. $a11$ is used to represent a probability that the beard color is black, $a12$ is used to represent a probability that the beard color is white, $a13$ is used to represent a probability that the beard color is gray, and $a14$ is used to represent a probability that there is no beard. $a2$ can be represented as a vector $a2=[a21, a22, a23, a24]$. $a21$ is used to represent a probability that the pouch type is the congenital type, $a22$ is used to represent a probability that the pouch type is the fatty type, $a23$ is used to represent a probability that the pouch type is the loose type, and $a24$ is used to represent a probability that the pouch type is a hybrid type. $a3$ can be represented as a vector $a3=[a31, a31, a32, a32]$. $a31$ is used to represent a probability that the gender is male, and $a32$ is used to represent a probability that the gender is female. $a4$ can be represented as a vector $a4=[a41, a42, a43, a44]$. $a41$ is used to represent a probability that the age stage is childhood, $a42$ is used to represent a probability that the age stage is adolescence, $a43$ is used to represent a probability that the age stage is youth, and $a44$ is used to represent a probability that the age stage is senility.

In some embodiments, the image fusion model can further include a context recognition model. The context recognition model is configured to extract a context feature from the resolution-enhanced target image. The context recognition model can include a neural network model, a support vector machine model, and the like. The neural network model can include a convolutional neural network model. The convolutional neural network model can include an AlexNet model, a GoogLeNet model, a DenseNet model, and the like. The context feature can be a feature vector, a feature matrix, or a feature map. The context feature is used to represent context information of the second biological object. The context feature includes at least one of the following: a posture feature used to represent posture information and a background feature used to represent background information. The posture information can include a deflection angle of a biological object. The background information can include a scene used to bring out a biological object. For example, the target image can be a face image. The context feature includes at least one of the following: a posture feature used to represent a face posture and a background feature used to represent a face background. The face posture can include a deflection angle of a face. The face background can include a scene used to bring out a face, such as a scene in a non-facial area of the image.

In some embodiments, the image fusion model can further include a feature fusion model. The feature fusion model is used to perform fusion on multiple features to generate the fused image. Specifically, the identity feature, the attribute feature, and the context feature are fused to generate the fused image. The feature fusion model can include a neural network model, an MFEFF-SSD model, and the like. In some scenario examples, the feature fusion model can include multiple feature fusion modules that are stacked sequentially and that have a same structure and an output module. Inputs of the first feature fusion module include the identity feature, the attribute feature, and the context feature. Inputs of a remaining feature fusion module include the identity feature, the attribute feature, the context feature, and an output of the above-mentioned feature fusion module. An output of the last feature fusion module can be used as an input of the output module. The output module is configured to output the fused image.

A specific technical principle of generating an image based on features is known to a person skilled in the art. Therefore, details are not described herein again.

In some embodiments, considering that directly cascading the resolution enhancement model and the image fusion model may be unable to properly fuse and utilize information of the two models, an intermediate feature of the resolution enhancement model in a process of performing resolution enhancement processing on the source image can be obtained, to further improve a fusion effect and make identity information and attribute information of the third biological object more consistent with the identity information and the attribute information of the first biological object. The intermediate feature can be biological feature information of the first biological object. The intermediate feature can be configured to generate the resolution-enhanced source image. As such, the feature fusion model can fuse the identity feature, the attribute feature, the context feature, and the intermediate feature to generate the fused image. The intermediate feature can vary with an architecture of the resolution enhancement model. For example, the resolution enhancement model can be an encoder-decoder model, and the intermediate feature can include an output of an encoder. For another example, the resolution enhancement model can be an SRCNN model, and the intermediate feature can include an output of a specific convolutional layer.

In some embodiments, the source image can include the first biological object, the target image can include the second biological object, and the fused image can include the third biological object. The identity information and the attribute information of the third biological object can be the same as the identity information and the attribute information of the first biological object. The context information of the third biological object can be the same as the context information of the second biological object. As such, by using the model architecture, detailed attributes of the biological object in the source image can be migrated to the biological object in the fused image, so that the detailed attributes of the biological object in the fused image are consistent with the detailed attributes of the biological object in the source image, thereby improving a degree of similarity between the detailed attributes of the fused image and the detailed attributes of the source image.

In some embodiments, the first biological object can be a victim, and the source image can be a biological feature image of the victim. The second biological object can be an attacker, and the target image can be a biological feature image of the attacker. A biological object in the fused image and the biological object in the source image are more similar in terms of detailed attributes, so that the fused image has a relatively strong attack force. As such, the fused image can be used to defend against attacks on the identity recognition model. For example, by using the fused image, adversarial training can be performed on the identity recognition model to improve robustness of the identity recognition model. The identity recognition model can include a model used to identify an identity in an application scenario such as face-scanning payment or access control recognition.

The following describes a scenario example in the embodiments of this specification.

Face shifting can shift a face from a source image to a target image while keeping a face posture and a background in the target image unchanged. In related technologies, a face-shifting model such as FSGAN or FaceShifter can be used to implement face shifting. However, on one hand, the above-mentioned face-shifting model is designed and implemented based on high-resolution images, and has undesirable performance for low-resolution images. On the other hand, the above-mentioned face-shifting model cannot keep face attributes consistent, causing a low degree of similarity between detailed attributes of a face-shifted image and detailed attributes of the source image. For example, a beard color in a source image is white, a face in a target image has no beard, and a beard color in a face-shifted image is black. Therefore, the beard color in the face-shifted image is different from the beard color in the source image, and a degree of similarity between the face-shifted image and the source image is not high.

In this scenario example, a low-resolution source image can be input into the resolution enhancement model to obtain a high-resolution source image; a low-resolution target image can be input into the resolution enhancement model to obtain a high-resolution target image; and the high-resolution source image and the high-resolution target image can be input into the image fusion model to obtain a high-resolution face-shifted image.

The low-resolution source image, the low-resolution target image, and the high-resolution face-shifted image can be face images. The low-resolution source image can include a first face. The low-resolution target image can include a second face. The high-resolution face-shifted image can include a third face. The third face can be understood as a fused face of the first face and the second face. Identity information and attribute information of the third face can be the same as identity information and attribute information of the first face. Context information of the third face can be the same as context information of the second face.

The low resolution can be, for example, 16×16 pixels, and the high resolution can be, for example, 256×256 pixels.

By using the model architecture, detailed attributes of the face in the high-resolution face-shifted image can be kept consistent with detailed attributes of the face in the low-resolution source image, thereby improving a degree of similarity between the detailed attributes of the high-resolution face-shifted image and the detailed attributes of the low-resolution source image. In addition, there is no obvious abnormal texture on a boundary between a face area and a non-face area in the high-resolution face-shifted image. As such, it cannot be identified by naked eyes that the high-resolution face-shifted image is forged.

The first face can be a victim, and the source image can be a face image of the victim. The second face can be an attacker, and the target image can be a face image of the attacker. The detailed attributes of the face in the high-resolution face-shifted image are kept consistent with the detailed attributes of the face in the low-resolution source image, so that the high-resolution face-shifted image has a relatively strong attack force. The high-resolution face-shifted image can be used to defend against attacks on the face recognition model. For example, by using the high-resolution face-shifted image, adversarial training can be performed on the face recognition model to improve robustness of the face recognition model. The face recognition model can include a model used to identify an identity in an application scenario such as face-scanning payment or access control recognition.

In this scenario example, the image fusion model can include the identity recognition model, the attribute recognition model, the context recognition model, and the feature fusion model. The high-resolution source image can be input into the identity recognition model to obtain the identity feature, and the high-resolution source image can be input into the attribute recognition model to obtain the attribute feature. The attribute feature is used to represent the attribute information of the first face. The attribute feature can include the beard feature, the pouch feature, the gender feature, and the age feature.

The high-resolution target image can be input into the context recognition model to obtain the context feature. The context feature can include the posture feature and the background feature. The posture feature is used to represent a posture of the second face, for example, a deflection angle of the second face. The background feature is used to represent a background of the second face, for example, a scene used to bring out the second face.

The identity feature, the attribute feature, the context feature, and the intermediate feature can be input into the feature fusion model to obtain the high-resolution face-shifted image. The intermediate feature can be an intermediate feature of the resolution enhancement model in a process of performing resolution enhancement processing on the low-resolution source image. The intermediate feature can be used to generate the high-resolution source image.

Some embodiments of this specification provide an image processing method. The image processing method can be applied to a computer device. The computer device includes but is not limited to a personal computer, a server, a server cluster including multiple servers, and the like.

Refer to FIG. 2. The image processing method can include the following steps.

Step S11: Obtain an identity feature and an attribute feature based on a source image.

In some embodiments, the source image can include a first biological object. The identity feature can be used to represent identity information of the first biological object. The attribute feature can be used to represent attribute information of the first biological object. In actual applications, the source image can be input into an identity recognition model to obtain the identity feature; and the source image can be input into an attribute recognition model to obtain the attribute feature. For the identity recognition model and the attribute recognition model, reference can be made to the above-mentioned embodiments, and details are not described herein again.

In some embodiments, the identity feature and the attribute feature can be extracted directly from the source image. Alternatively, resolution enhancement processing can be further performed on the source image, and the identity feature and the attribute feature can be extracted from a resolution-enhanced source image. Specifically, resolution enhancement processing can be performed based on a super-resolution algorithm. In actual applications, the source image can be input into a resolution enhancement model to obtain the resolution-enhanced source image. Such practice helps generate a high-resolution fused image based on a low-resolution source image.

Step S13: Obtain a context feature based on a target image.

In some embodiments, the target image can include a second biological object. The context feature is used to represent context information of the second biological object. The context feature includes at least one of the following: a posture feature used to represent posture information and a background feature used to represent background information. In actual applications, the target image can be input into a context recognition model to obtain the context feature. For the context recognition model, reference can be made to the above-mentioned embodiments, and details are not described herein again.

In some embodiments, the context feature can be extracted directly from the target image. Alternatively, resolution enhancement processing can be further performed on the target image, and the context feature can be extracted from a resolution-enhanced target image. Specifically, resolution enhancement processing can be performed based on a super-resolution algorithm. In actual applications, the target image can be input into the resolution enhancement model to obtain the resolution-enhanced target image. Such practice helps generate a high-resolution fused image based on a low-resolution target image.

Step S15: Generate a fused image of the source image and the target image based on the identity feature, the attribute feature, and the context feature.

In some embodiments, the fused image is an image obtained by fusing the source image and the target image. The "fusing" can be fusing information in the source image and information in the target image into the fused image. The fused image can be a biological feature image.

The fused image can include a third biological object. The third biological object each can be a face, an iris, a sclera, a fingerprint, a palmprint, a teeth bite, or the like. The third biological object can be a fused biological object of the first biological object and the second biological object. The "fusing" can be fusing information about the first biological object and information about the second biological object into the third biological object. Specifically, the identity information and the attribute information of the first biological object are migrated to the third biological object, so that identity information and attribute information of the third biological object are the same as the identity information and the attribute information of the first biological object. The context information of the second biological object is migrated to the third biological object, so that context information of the third biological object is the same as the context information of the second biological object.

In some embodiments, the identity feature is used to make the identity information of the third biological object the same as the identity information of the first biological object. The attribute feature is used to make the attribute information of the third biological object the same as the attribute information of the first biological object. The context feature is used to make the context information of the third biological object the same as the context information of the second biological object. The identity feature, the attribute feature, and the context feature can be fused to obtain the fused image of the source image and the target image. Specifically, the identity feature, the attribute feature, and the context feature can be input into a feature fusion model to obtain the fused image of the source image and the target image. In actual applications, the identity feature, the attribute feature, and the context feature can be directly input into the feature fusion model. Alternatively, dimension expansion processing can be performed on the identity feature, the attribute feature, and the context feature, and a dimension-expanded identity feature, a dimension-expanded attribute feature, and a dimension-expanded context feature can be input into the feature fusion model. The dimension expansion processing is used to map a low-dimensional feature to a high-dimensional feature, for example, map a feature vector to a feature map.

In some embodiments, an intermediate feature can be obtained to further improve a fusion effect and make the identity information and the attribute information of the third biological object more consistent with the identity information and the attribute information of the first biological object; and the fused image can be generated based on the identity feature, the attribute feature, the context feature, and the intermediate feature. The intermediate feature can be a feature extracted based on the source image in the resolution enhancement processing step, and is used to generate the resolution-enhanced source image.

For a specific process of generating the fused image based on the identity feature, the attribute feature, the context feature, and the intermediate feature, reference can be made to the specific process of generating the fused image based on the identity feature, the attribute feature, and the context feature, and details are not described herein again.

According to the image processing methods in the embodiments of this specification, the identity feature and the attribute feature can be obtained based on the source image; the context feature can be obtained based on the target image; and the fused image of the source image and the target image can be generated based on the identity feature, the attribute feature, and the context feature. As such, detailed attributes of the biological object in the source image can be migrated to the biological object in the fused image in an attribute editing way, so that the detailed attributes of the biological object in the fused image are consistent with the detailed attributes of the biological object in the source image, thereby improving a degree of similarity between the detailed attributes of the fused image and the detailed attributes of the source image.

Some embodiments of this specification provide a model training method. The model training method can be applied to a computer device. The computer device includes but is not limited to a personal computer, a server, a server cluster including multiple servers, and the like.

Figure 4:
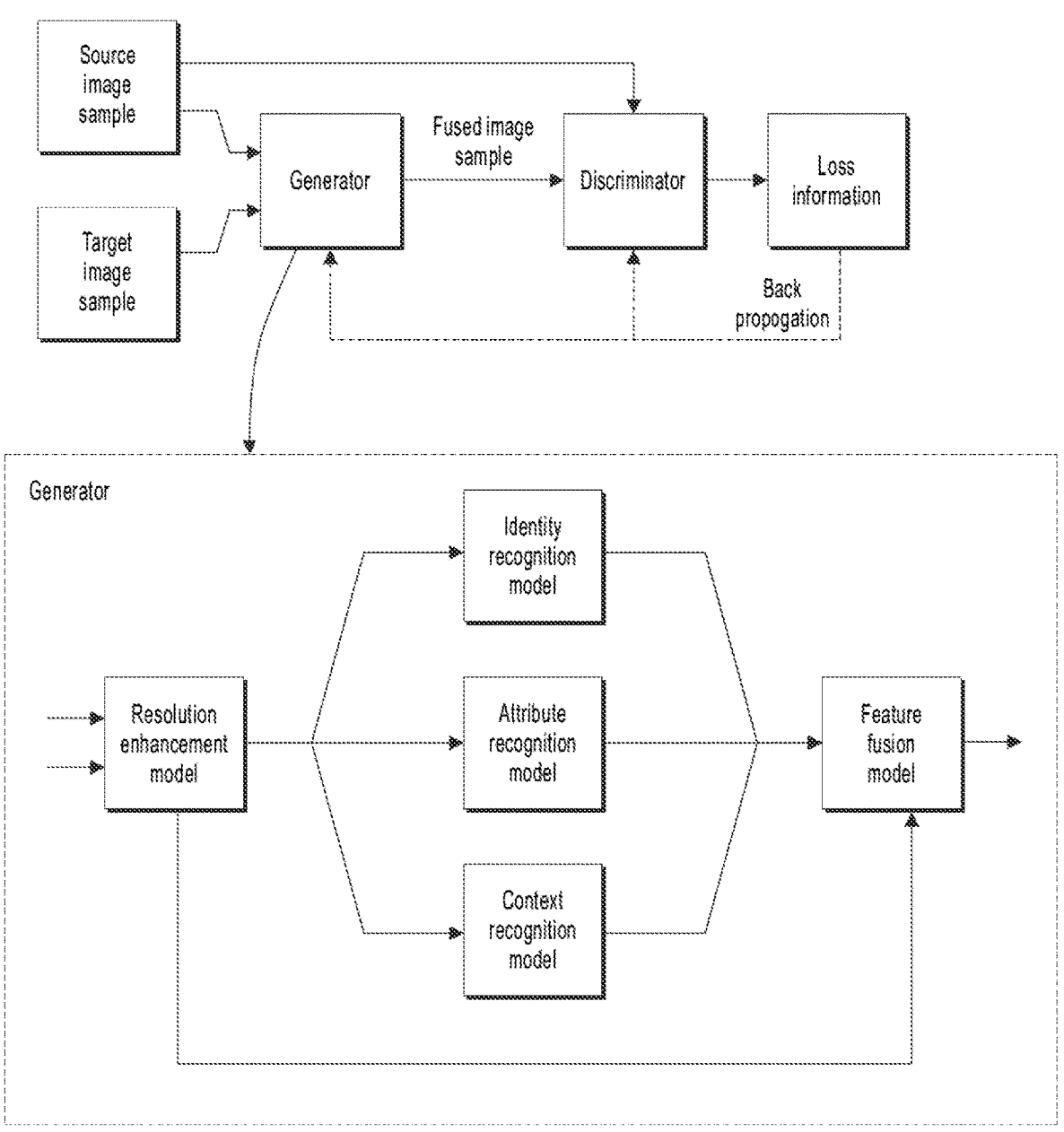
FIG. 4 is a schematic diagram of a training process of an adversarial network according to some embodiments of this specification.

Refer to FIG. 3 and FIG. 4. The model training method can include the following steps.

Step S21: Input a source image sample and a target image sample into a generator in an adversarial network to obtain a fused image sample of the source image sample and the target image sample.

In some embodiments, the source image sample, the target image sample, and the fused image sample can be biological feature images. For example, the source image sample and the target image sample can be face images, and the fused image sample can be a face-shifted image. Specifically, the source image sample can include a first biological object, and the first biological object can be a face, an iris, a sclera, a fingerprint, a palmprint, a teeth bite, or the like. The target image sample can include a second biological object, and the second biological object can be a face, an iris, a sclera, a fingerprint, a palmprint, a teeth bite, or the like. The fused image sample can include a third biological object, and the third biological object can be a face, an iris, a sclera, a fingerprint, a palmprint, a teeth bite, or the like. The third biological object can be a fused biological object of the first biological object and the second biological object.

In some embodiments, the adversarial network (GAN, Generative Adversarial Networks) is a deep learning model that can include a generator (Generative Model) and a discriminator (Discriminative Model). The generator can be obtained based on the model architecture shown in FIG. 1. Specifically, the generator can be the image fusion model in the model architecture shown in FIG. 1. Alternatively, the generator can be the model architecture shown in FIG. 1. The generator is configured to generate the fused image sample based on the source image sample and the target image sample. The discriminator can include a classifier, such as a binary classifier or a multi-classifier. The discriminator can be a fully-connected neural network, a convolutional neural network model, a cyclic neural network model, a long-short term memory network model, or the like. The discriminator can be configured to distinguish between the biological object in the fused image sample and the biological object in the source image sample. For example, if identity information and/or attribute information of the third biological object in the fused image sample are/is the same as identity information and/or attribute information of the first biological object in the source image, the discriminator can consider that the biological objects in the fused image sample and the source image sample are the same biological object. If the identity information and/or the attribute information of the third biological object in the fused image sample are/is different from the identity information and/or the attribute information of the first biological object in the source image, the discriminator can consider that the biological objects in the fused image sample and the source image sample are different biological objects.

In some embodiments, the generator can include an identity recognition model, an attribute recognition model, and a context recognition model. As such, the source image sample can be input into the identity recognition model and the attribute recognition model to obtain an identity feature and an attribute feature; the target image sample can be input into the context recognition model to obtain a context feature; and the identity feature, the attribute feature, and the context feature can be input into a feature fusion model to obtain the fused image sample. The identity feature is used to represent the identity information of the first biological object. The attribute feature is used to represent the attribute information of the first biological object. The context feature is used to represent context information of the second biological object. For the identity feature, the attribute feature, and the context feature, reference can be made to the above-mentioned description.

In some embodiments, the generator can further include a resolution enhancement model. As such, the source image sample can be input into the resolution enhancement model to obtain a resolution-enhanced source image sample; the resolution-enhanced source image sample can be input into the identity recognition model and the attribute recognition model to obtain the identity feature and the attribute feature; the target image can be input into the resolution enhancement model to obtain a resolution-enhanced target image sample; and the resolution-enhanced target image sample can be input into the context recognition model to obtain the context feature.

In some embodiments, an intermediate feature of the resolution enhancement model in a process of performing resolution enhancement processing on the source image sample can be further obtained, to further improve a fusion effect and make the identity information and the attribute information of the third biological object more consistent with the identity information and the attribute information of the first biological object. The intermediate feature can be used to generate the resolution-enhanced source image sample. As such, the identity feature, the attribute feature, the context feature, and the intermediate feature can be input into the feature fusion model to obtain the fused image sample.

In some embodiments, one or more sample sets can be collected. The sample set includes the source image sample and the target image sample. The source image sample and the target image sample in each sample set can be input into the generator to obtain the fused image sample.

Step S23: Input the source image sample and the fused image sample into the discriminator in the adversarial network to obtain a discrimination result.

In some embodiments, the source image sample in the sample set and a fused image sample corresponding to the sample set can be input into the discriminator to obtain a discrimination result. The fused image sample corresponding to the sample set can be the fused image sample generated based on the source image sample and the target image sample in the sample set. The discrimination result is used to indicate whether the biological objects in the fused image sample and the source image sample are the same biological object. Specifically, the discrimination result can include a probability value. The probability value is used to indicate a probability that the biological objects in the fused image sample and the source image sample are the same biological object. For example, the probability value can be a real number in an interval [0, 1]. Alternatively, the discrimination result can further include an identifier. The identifier is used to indicate whether the biological objects in the fused image sample and the source image sample are the same biological object. For example, the discrimination result can be 0 or 1.0 is used to indicate that the biological objects in the fused image sample and the source image sample are the same biological object, and 1 is used to indicate that the biological objects in the fused image sample and the source image sample are different biological objects.

Step S25: Optimize a model parameter of the adversarial network based on the discrimination result by using a loss function.

In some embodiments, the loss function includes at least a first term. The first term is used to constrain an attribute information deviation between the third biological object and the first biological object. Specifically, the first term can include a first sub-term and/or a second sub-term. The first sub-term is used to constrain an attribute migration loss between the third biological object and the first biological object. For example, the second term can be represented as $L_{at} = \|p(I_{source}) - p(I_{swapped})\|$. $I_{source}$ represents the source image sample. $I_{swapped}$ represents the fused image sample. $p(I_{source})$ represents an output of the attribute recognition model after the source image sample is input into the attribute recognition model. $p(I_{swapped})$ represents an output of the attribute recognition model after the fused image sample is input into the attribute recognition model. $\| \ \|$ represents a 2-norm. The second sub-term is used to constrain an attribute consistency loss between the third biological object and the first biological object. The second sub-term can include a cross-entropy loss function, a mean square error loss function, or the like. For example, the second sub-term can be a cross-entropy loss function $L_{ce} = 1/$ $N\Sigma_n-(y_n \log x_n+(1-y_n)\log(1-x_n))$. $x_n$ represents an output of the attribute recognition model after the source image sample is input into the attribute recognition model. $y_n$ represents an attribute label of the $n^{th}$ source image sample. The attribute label is used to represent the attribute information (for example, an attribute category) of the first biological object in the source image sample. N represents a quantity of source image samples.

Certainly, the loss function can further include at least one of the following: a second term, a third term, and a fourth term.

The second term is used to constrain an identity information loss between the third biological object and the first biological object. For example, the second term can be represented as $L_{COS}=1-\cos(q(I_{source}), q(I_{swapped}))$. $I_{source}$ represents the source image sample. $I_{swapped}$ represents the fused image sample. $q(I_{source})$ represents an output of the identity recognition model after the source image sample is input into the identity recognition model. $q(I_{swapped})$ represents an output of the identity recognition model after the fused image sample is input into the identity recognition model. cos indicates a degree of cosine similarity. The third term is used to constrain a pixel loss between the fused image sample and the source image sample. For example, the third term can be represented as $L_{rec}=\|I_{source}-I_{swapped}\|$. $I_{source}$ represents the source image sample. $I_{swapped}$ represents the fused image sample. $\|\ \|$ represents a 2-norm. The fourth term is used to constrain a loss of the adversarial network. For example, the fourth term can be represented as $$L_{gan} = \min_{G}\max_{D}E_{x\sim P_r}[\log D(x)] + E_{G(z)\sim P_g}[1 - \log D(G(z))].$$

x represents the source image sample, $P_r$ represents a set formed by source image samples, and $P_g$ represents a set formed by fused image samples. D(x) represents the discrimination result. G (z) represents the fused image sample. z represents the sample set.

In some scenario examples, the loss function can be represented as a weighted sum of the first, second, third, and fourth terms. For example, the loss function can be represented as $L=\gamma_1 L_{gan}+\gamma_2 L_{ce}+\gamma_3 L_{at}+\gamma_4 L_{cos}+\gamma_5 L_{rec}$. $\gamma_1, \gamma_2, \gamma_3, \gamma_4$, and $\gamma_5$ are weight coefficients. $\gamma_1, \gamma_2, \gamma_3, \gamma_4$, and $\gamma_5$ can be super parameters of the adversarial network.

It should be noted that the above-mentioned equations (for example, the calculation equation of the first sub-term, the calculation equation of the second sub-term, the calculation equation of the second term, the calculation equation of the third term, the calculation equation of the fourth term, and the calculation equation of the loss function) are merely examples. Actual applications are not limited thereto, and can further have other variants or changes.

In some embodiments, a training process of the adversarial network can be a game process of the generator and the discriminator. The generator is configured to generate a fused image sample as similar to the source image sample as possible to deceive the discriminator. The discriminator is configured to try to distinguish between the biological objects in the source image sample and the fused image sample. Loss information can be calculated based on the discrimination result by using the loss function, and the model parameter of the adversarial network can be optimized based on the loss information. For example, the model parameter of the adversarial network is optimized by using a back propagation algorithm. The model parameter of the adversarial network can specifically include a model parameter of the generator and a model parameter of the discriminator.

The model parameter of the generator and the model parameter of the discriminator in the adversarial network can be alternately optimized. A training process of the adversarial network can include one or more iteration processes. Each iteration process can include a first stage and a second stage. In the first stage, the model parameter of the generator can be kept unchanged, while the model parameter of the discriminator can be optimized. Specifically, the source image sample and the target image sample can be input into the generator to obtain a fused image sample of the source image sample and the target image sample; the fused image sample and the source image sample can be input into the discriminator to obtain a discrimination result; and the model parameter of the discriminator can be optimized based on the discrimination result. In the second stage, the model parameter of the discriminator can be kept unchanged, while the model parameter of the generator can be optimized. The source image sample and the target image sample can be input into the generator to obtain a fused image sample of the source image sample and the target image sample; the fused image sample and the source image sample can be input into the discriminator to obtain a discrimination result; and the model parameter of the generator can be optimized based on the discrimination result.

An iteration termination condition can be as follows: A quantity of iteration times reaches a predetermined quantity of times. Certainly, the iteration termination condition can alternatively be in another form. For example, the discriminator cannot distinguish between the biological objects in the fused image sample and the source image sample.

According to the model training method in the embodiments of this specification, the loss function of the adversarial network can include the first term, and the first term is used to constrain the attribute information deviation between the third biological object and the first biological object. Therefore, the generator obtained by training by using the loss function can generate a fused image that has detailed attributes more similar with the detailed attributes of the source image.

Figure 5:
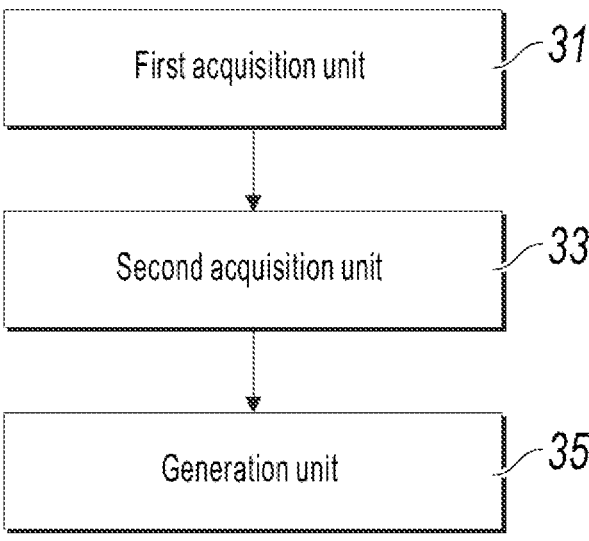
FIG. 5 is a schematic diagram of a structure of an image processing apparatus according to some embodiments of this specification.

Refer to FIG. 5. Some embodiments of this specification further provide an image processing apparatus, which specifically includes the following units:

a first acquisition unit 31, configured to obtain an identity feature and an attribute feature based on a source image, where the source image includes a first biological object, the identity feature is used to represent identity information of the first biological object, and the attribute feature is used to represent attribute information of the first biological object;

a second acquisition unit 33, configured to obtain a context feature based on a target image, where the target image includes a second biological object, and the context feature is used to represent context information of the second biological object; and a generation unit 35, configured to generate a fused image of the source image and the target image based on the identity feature, the attribute feature, and the context feature, where the fused image includes a third biological object, identity information and attribute information of the third biological object are the same as the identity information and the attribute information of the first biological object, and context information of the third biological object is the same as the context information of the second biological object.

Figure 6:
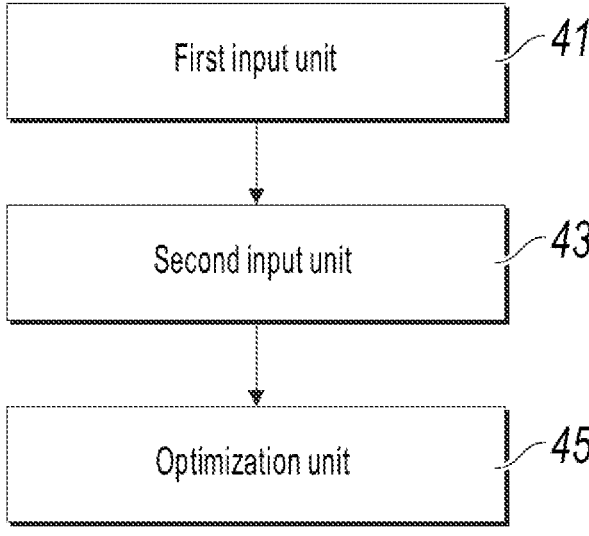
FIG. 6 is a schematic diagram of a structure of a model training apparatus according to some embodiments of this specification.

Refer to FIG. 6. Some embodiments of this specification further provide a model training apparatus, which specifically includes the following units:

a first input unit 41, configured to input a source image sample and a target image sample into a generator in an adversarial network to obtain a fused image sample of the source image sample and the target image sample, where the source image sample includes a first biological object, the target image sample includes a second biological object, and the fused image sample includes a third biological object;

a second input unit 43, configured to input the source image sample and the fused image sample into a discriminator in the adversarial network to obtain a discrimination result; and an optimization unit 45, configured to optimize a model parameter of the adversarial network based on the discrimination result by using a loss function, where the loss function includes at least a first term, and the first term is used to constrain an attribute information deviation between the third biological object and the first biological object.

Figure 7:
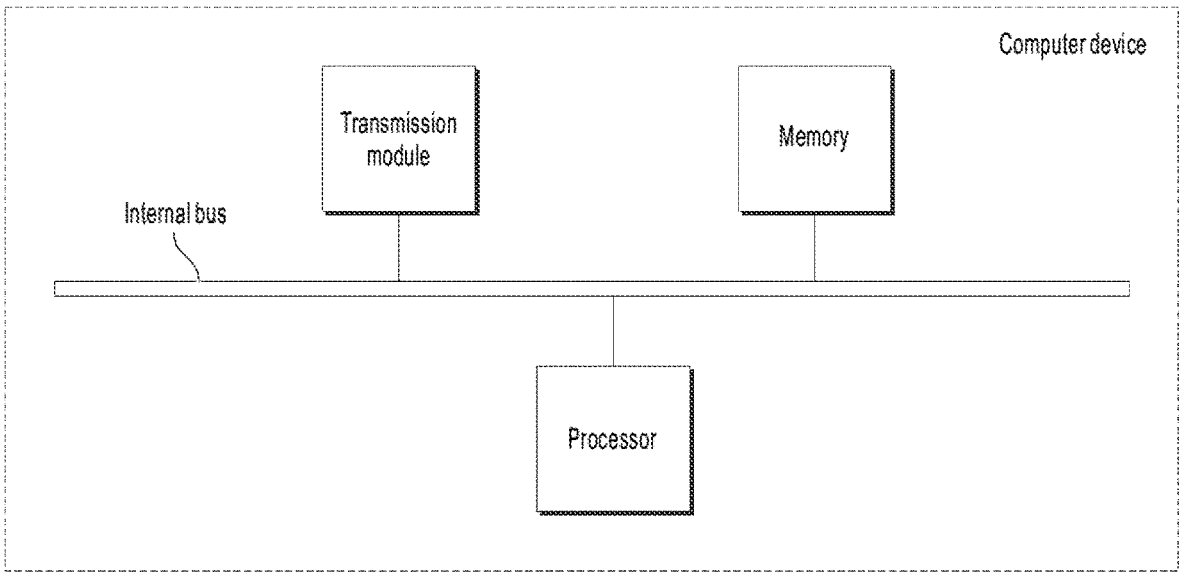
FIG. 7 is a schematic diagram of a structure of a computer device according to some embodiments of this specification.

The following describes an embodiment of a computer device in this specification. FIG. 7 is a schematic diagram of a hardware structure of a computer device according to this embodiment. As shown in FIG. 7, the computer device can include one or more processors (only one is shown in the figure), a memory, and a transmission module. Certainly, a person of ordinary skill in the art can understand that the hardware structure shown in FIG. 7 is merely an example, and does not impose a limitation on the hardware structure of the computer device described above. In practice, the computer device can further include more or fewer component units than those shown in FIG. 7; or have configurations different from those shown in FIG. 7.

The memory can include a high-speed random access memory; or can further include a non-volatile memory, such as one or more magnetic storage apparatuses, a flash memory, or another non-volatile solid-state memory. Certainly, the memory can further include a remotely disposed network memory. The memory can be configured to store program instructions or modules of application software, for example, the program instructions or modules of the embodiment corresponding to FIG. 2 or FIG. 3 in this specification.

The processor can be implemented by using any appropriate method. For example, the processor can be in a form of a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microcontroller. The processor can read and execute the program instructions or modules in the memory.

The transmission module can be configured to perform data transmission by using a network, for example, by using a network such as the Internet, an enterprise intranet, a local area network, or a mobile communications network.

This specification further provides some embodiments of a computer storage medium. The computer storage medium includes but is not limited to a random access memory (RAM), a read-only memory (ROM), a cache, a hard disk drive (HDD), and a memory card. The computer storage medium stores computer program instructions. When the computer program instructions are executed, program instructions or modules in the embodiment corresponding to FIG. 2 or FIG. 3 in this specification are implemented.

It should be noted that, the embodiments in this specification are described in a progressive way. For same or similar parts of the embodiments, references can be made to the embodiments mutually. Each embodiment focuses on a difference from other embodiments. Particularly, apparatus embodiments, computer device embodiments, and computer storage medium embodiments are similar to method embodiments, and therefore are described briefly. For related parts, references can be made to related descriptions in the method embodiments. In addition, it can be understood that, a person skilled in the art can, after reading the document of this specification, figure out any combination of some or all of the embodiments listed in this specification without creative efforts. These combinations also fall within the protection scope disclosed in this specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the above-mentioned embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

It can be learned from the descriptions of the above-mentioned implementations that, a person skilled in the art can clearly understand that this specification can be implemented by software and a necessary general-purpose hardware platform. Based on such an understanding, the technical solutions of this specification essentially or the part contributing to the existing technologies can be embodied in a form of a software product. The computer software product can be stored in a storage medium, such as a ROM/RAM, a magnetic disk, or an optical disc, and includes several instructions for enabling a computer device (which can be a personal computer, a server, a network device, or the like) to perform the method described in embodiments of this specification or some parts of the embodiments.

This specification can be applied to numerous general-purpose or special-purpose computer system environments or configurations, for example, a personal computer, a server computer, a handheld device or a portable device, a tablet device, a multi-processor system, a microprocessor-based system, a set top box, a programmable consumer electronic device, a network PC, a small-scale computer, a large-scale computer, and a distributed computing environment that includes any of the above-mentioned systems or devices.

This specification can be described in common contexts of computer-executable instructions executed by a computer, such as a program module. Generally, the program module includes a routine, a program, an object, a component, a data structure, etc. executing a specific task or implementing a specific abstract data type. This specification can also be practiced in distributed computing environments. In the distributed computing environments, tasks are performed by remote processing devices that are connected through a communications network. In a distributed computing environment, the program module can be located in both local and remote computer storage media including storage devices.

Although this specification is depicted by using embodiments, it is known to a person of ordinary skill in the art that, this specification has many variations and changes without departing from the spirit of this specification, and it is desired that the appended claims include these variations and changes without departing from the spirit of this specification.

What is claimed is:

1. A computer-implemented method for image processing, comprising:

obtaining, based on a source image, an identity feature and an attribute feature, wherein the source image includes a first biological object, the identity feature is used to represent identity information of the first biological object, and the attribute feature is used to represent attribute information of the first biological object;

obtaining, based on a target image, a context feature, wherein the target image includes a second biological object, and wherein the context feature is used to represent context information of the second biological object; and generating, based on the identity feature, the attribute feature, and the context feature, a fused image of the source image and the target image, wherein the fused image includes a fused biological object of the first biological object and the second biological object, identity information and attribute information of the fused biological object is identical to the identity information and the attribute information of the first biological object, and context information of the fused biological object is identical to the context information of the second biological object, and wherein the context feature comprises at least one of a posture feature used to represent posture information and a background feature used to represent background information, and the attribute feature includes at least one of:

a beard feature used to represent beard information;

a pouch feature used to represent pouch information;

a gender feature used to represent gender information; and an age feature used to represent age information.

2. The computer-implemented method of claim 1, wherein:

obtaining, based on a source image, an identity feature and an attribute feature, comprises:

inputting the source image into an identity recognition model to obtain the identity feature;

inputting the source image into an attribute recognition model to obtain the attribute feature;

obtaining, based on a target image, a context feature, comprises:

inputting the target image into a context recognition model to obtain the context feature; and generating a fused image of the source image and the target image, comprises:

inputting the identity feature, the attribute feature, and the context feature into a feature fusion model to obtain the fused image.

3. The computer-implemented method of claim 1, comprising:

performing resolution enhancement processing on the source image and the target image; and obtaining, based on a source image, an identity feature and an attribute feature, comprises:

obtaining, based on a resolution-enhanced source image, the identity feature and the attribute feature; and obtaining, based on a target image, a context feature, comprises:

obtaining, based on a resolution-enhanced target image, the context feature.

4. The computer-implemented method of claim 3, wherein generating a fused image of the source image and the target image, comprises:

generating, based on the identity feature, the fused image, the attribute feature, the context feature, and an intermediate feature, wherein the intermediate feature is a feature extracted based on the source image in the resolution enhancement processing and is used to generate the resolution-enhanced source image.

5. The computer-implemented method of claim 3, wherein performing resolution enhancement processing on the source image and the target image, comprises:

inputting the source image and the target image into a resolution enhancement model to obtain the resolution-enhanced source image and the resolution-enhanced target image.

6. The computer-implemented method of claim 1, wherein:

the source image and the target image are face images;

the first biological object, the second biological object, and the fused biological object are faces; and the fused image is a face-shifted image.

7. A non-transitory, computer-readable medium storing one or more instructions executable by a computer system to perform operations for image processing, comprising:

obtaining, based on a source image, an identity feature and an attribute feature, wherein the source image includes a first biological object, the identity feature is used to represent identity information of the first biological object, and the attribute feature is used to represent attribute information of the first biological object;

obtaining, based on a target image, a context feature, wherein the target image includes a second biological object, and wherein the context feature is used to represent context information of the second biological object; and generating, based on the identity feature, a fused image of the source image and the target image, the attribute feature, and the context feature, wherein the fused image includes a fused biological object of the first biological object and the second biological object, identity information and attribute information of the fused biological object is identical to the identity information and the attribute information of the first biological object, and context information of the fused biological object is identical to the context information of the second biological object, and wherein the context feature comprises at least one of a posture feature used to represent posture information and a background feature used to represent background information, and the attribute feature includes at least one of:

a beard feature used to represent beard information;

a pouch feature used to represent pouch information;

a gender feature used to represent gender information; and an age feature used to represent age information.

8. The non-transitory, computer-readable medium of claim 7, wherein:

obtaining, based on a source image, an identity feature and an attribute feature, comprises:

inputting the source image into an identity recognition model to obtain the identity feature;

inputting the source image into an attribute recognition model to obtain the attribute feature;

obtaining, based on a target image, a context feature, comprises:

inputting the target image into a context recognition model to obtain the context feature; and generating a fused image of the source image and the target image, comprises:

inputting the identity feature, the attribute feature, and the context feature into a feature fusion model to obtain the fused image.

9. The non-transitory, computer-readable medium of claim 7, comprising one or more instructions for:

performing resolution enhancement processing on the source image and the target image; and obtaining, based on a source image, an identity feature and an attribute feature, comprises:

obtaining, based on a resolution-enhanced source image, the identity feature and the attribute feature; and obtaining, based on a target image, a context feature, comprises:

obtaining, based on a resolution-enhanced target image, the context feature.

10. The non-transitory, computer-readable medium of claim 9, wherein generating a fused image of the source image and the target image, comprises:

generating, based on the identity feature, the fused image, the attribute feature, the context feature, and an intermediate feature, wherein the intermediate feature is a feature extracted based on the source image in the resolution enhancement processing and is used to generate the resolution-enhanced source image.

11. The non-transitory, computer-readable medium of claim 9, wherein performing resolution enhancement processing on the source image and the target image, comprises:

inputting the source image and the target image into a resolution enhancement model to obtain the resolution-enhanced source image and the resolution-enhanced target image.

12. The non-transitory, computer-readable medium of claim 7, wherein:

the source image and the target image are face images;

the first biological object, the second biological object, and the fused biological object are faces; and the fused image is a face-shifted image.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations for image processing, comprising:

obtaining, based on a source image, an identity feature and an attribute feature, wherein the source image includes a first biological object, the identity feature is used to represent identity information of the first biological object, and the attribute feature is used to represent attribute information of the first biological object;

obtaining, based on a target image, a context feature, wherein the target image includes a second biological object, and wherein the context feature is used to represent context information of the second biological object; and generating, based on the identity feature, a fused image of the source image and the target image, the attribute feature, and the context feature, wherein the fused image includes a fused biological object of the first biological object and the second biological object, identity information and attribute information of the fused biological object is identical to the identity information and the attribute information of the first biological object, and context information of the fused biological object is identical to the context information of the second biological object, and wherein the context feature comprises at least one of a posture feature used to represent posture information and a background feature used to represent background information, and the attribute feature includes at least one of:

a beard feature used to represent beard information;

a pouch feature used to represent pouch information;

a gender feature used to represent gender information; and an age feature used to represent age information.

14. The computer-implemented system of claim 13, wherein:

obtaining, based on a source image, an identity feature and an attribute feature, comprises:

inputting the source image into an identity recognition model to obtain the identity feature;

inputting the source image into an attribute recognition model to obtain the attribute feature;

obtaining, based on a target image, a context feature, comprises:

inputting the target image into a context recognition model to obtain the context feature; and generating a fused image of the source image and the target image, comprises:

inputting the identity feature, the attribute feature, and the context feature into a feature fusion model to obtain the fused image.

15. The computer-implemented system of claim 13, comprising one or more instructions for:

performing resolution enhancement processing on the source image and the target image; and obtaining, based on a source image, an identity feature and an attribute feature, comprises:

obtaining, based on a resolution-enhanced source image, the identity feature and the attribute feature; and obtaining, based on a target image, a context feature, comprises:

obtaining, based on a resolution-enhanced target image, the context feature.

16. The computer-implemented system of claim 15, wherein generating a fused image of the source image and the target image, comprises:

generating, based on the identity feature, the fused image, the attribute feature, the context feature, and an intermediate feature, wherein the intermediate feature is a feature extracted based on the source image in the resolution enhancement processing and is used to generate the resolution-enhanced source image.

17. The computer-implemented system of claim 15, wherein performing resolution enhancement processing on the source image and the target image, comprises:

inputting the source image and the target image into a resolution enhancement model to obtain the resolution-enhanced source image and the resolution-enhanced target image.

* * * * *